United States Patent [19]

Cerboni

[11] 4,135,619
[45] Jan. 23, 1979

[54] APPARATUS FOR TRANSFERRING CONFECTIONERY PRODUCTS FROM A FEEDING CONVEYOR TO A RECEIVING CONVEYOR

[75] Inventor: Renzo Cerboni, Milan, Italy

[73] Assignee: Carle & Montanari S.p.A., Milan, Italy

[21] Appl. No.: 794,831

[22] Filed: May 9, 1977

[30] Foreign Application Priority Data

Jun. 11, 1976 [IT] Italy .................................. 24170 A/76

[51] Int. Cl.² ............................................. B65G 47/52
[52] U.S. Cl. ........................................ 198/477; 53/247; 198/449; 198/478; 198/689; 214/1 BA; 214/1 BS; 271/186; 271/194
[58] Field of Search ............... 198/404, 449, 450, 476, 198/478, 480, 689, 477; 271/184, 185, 186, 194, 196, 197, 276; 214/1 BA, 1 BS; 53/247

[56] References Cited

U.S. PATENT DOCUMENTS

| 3,143,232 | 8/1964 | Hansel et al. ...................... 214/1 BA |
| 3,729,888 | 5/1973 | Carle ........................................ 53/247 |
| 3,851,751 | 12/1974 | Jones ...................................... 198/689 |
| 3,941,233 | 3/1976 | Aivola et al. ..................... 214/1 BA |
| 3,957,152 | 5/1976 | Heitmann ............................. 198/689 |
| 4,050,574 | 9/1977 | Chenevard et al. ................ 198/689 |

Primary Examiner—Robert W. Saifer
Assistant Examiner—Jeffrey V. Nase
Attorney, Agent, or Firm—Ralph W. Kalish

[57] ABSTRACT

An apparatus for the collecting and transferring confectionery products onto a receiving conveyor feeding a wrapping machine, in which above a feeding conveyor belt carrying the dies provided with the products there is arranged a transfer conveyor equipped with prehensile elements for removing the products from the dies, this conveyor cooperating with a further transfer conveyor also fitted with prehensile elements for taking up the confectionery products from the first transfer conveyor and depositing them as required on the receiving conveyor.

3 Claims, 6 Drawing Figures

APPARATUS FOR TRANSFERRING CONFECTIONERY PRODUCTS FROM A FEEDING CONVEYOR TO A RECEIVING CONVEYOR

BACKGROUND OF THE INVENTION

The present invention relates to an apparatus to be used in particular for removing confectionery products from pouring dies carried by a feeding conveyor and for transferring them to and depositing them into confectionery boxes or onto a receiving conveyor belt feeding a wrapping machine.

Devices for removing confectionery items from forming or pouring dies and depositing them subsequently into packaging boxes are already known.

A known device comprises essentially two sets of prehensile elements cooperating with two parallel conveyor belts, the two sets of prehensile elements being arranged so that one set removed by means of suckers the products from the respective forming dies to pass them to the second set which deposits the products into packaging boxes. These known prehensile elements thus follow an oscillating movement between a center line and, respectively, the die carrying belt and the packaging box carrying belt.

A first drawback of this known device is given by the fact that the oscillating motion required by the prehensile elements makes it difficult to adapt the product removing and depositing speed to that required by modern wrapping and packaging machines, operating a high speeds capable to wrap and package, for instance, up to 300 chocolate bars in one minute.

A further drawback of the known device lies in the fact that the conveyor belts have to be arranged in the same plane and, preferably, parallel one to the other, so that it becomes impossible to transfer the items between a first belt and a second belt lying on different levels, with the second belt running, for example, perpendicularly to the first belt carrying the forming dies.

SUMMARY OF THE INVENTION

It is one object of the invention to obviate the drawbacks inherent in the prior art and to provide an apparatus of the type specified whose working speed satisfies the requirements of modern wrapping machines, which is easily constructed and operates without trouble and further allows to transfer confectionery items from forming dies to a conveying means provided for feeding one or more wrapping machines, the items being turned through 180° and deposited in well aligned and regular form. Another object is to simplify the operating cycle of the products from the moment of the removal thereof from the forming dies up to the moment of their packaging, thus reducing also product alteration and waste and obviating the need of complicated and costly alignment means.

These are reached according to the present invention by providing above the conveyor carrying the forming dies a first continuously or intermittently driven transfer conveyor equipped with prehensile elements for removing the products from the forming dies, this first transfer conveyor cooperating with a second continuously or intermittently driven transfer conveyor, also equipped with prehensile elements and designed for receiving the products from the corresponding prehensile elements of the said first continuously or intermittently driven transfer conveyor and for depositing them successively on a receiving conveyor provided for feeding one or more wrapping machines.

In a preferred embodiment of this invention, the transfer conveyor cooperating with that carrying the forming dies is a continuous chain conveyor equipped with prehensile elements, while the second continuous or intermittent transfer conveyor, too, is designed as an intermittent or continuous chain conveyor.

A second advantageous embodiment of this invention has the first transfer conveyor in the form of a continuous or intermittent drum conveyor equipped with prehensile elements and cooperating with a second drum conveyor for depositing the products as above.

It is also possible to arrange a continuous or intermittent chain conveyor in combination with a drum conveyor.

Further characteristics of this invention will result from the following description and on hand of the accompanying drawings and claims.

BRIEF DESCRIPTION OF THE DRAWINGS

The apparatus, according to the present invention, will now be described more in detail by illustrating some possible embodiments thereof given by way of example and schematically illustrated in the accompanying drawings, in which.

DESCRIPTION OF PRACTICAL EMBODIMENTS

Figure 1:
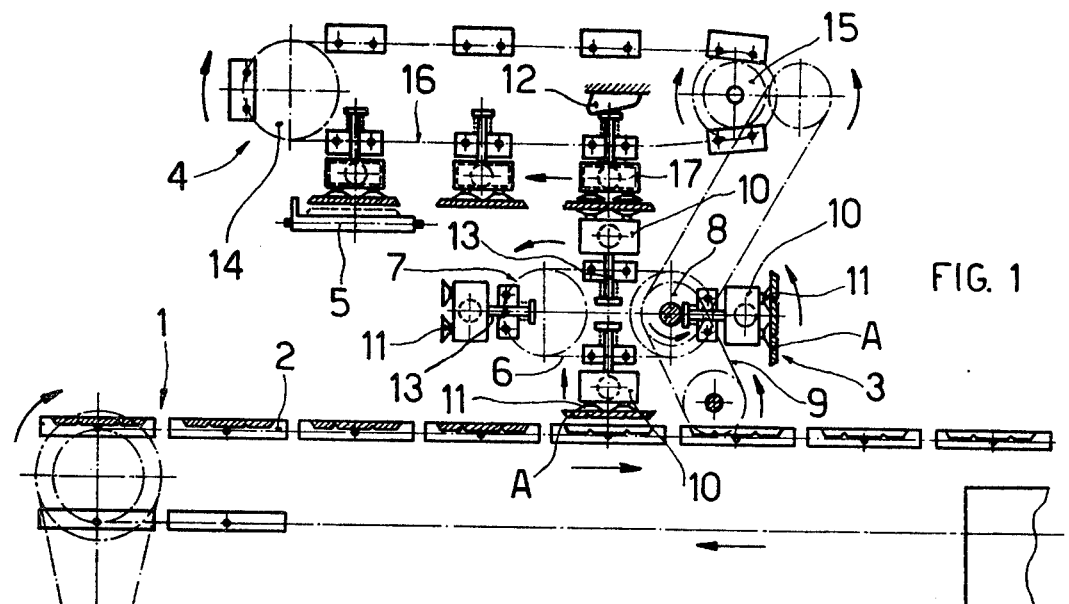
FIG. 1 is a schematic elevation view of a first embodiment of the inventor using continuous or intermittent chain conveyors.

As shown in FIG. 1, above a feeding conveyor 1 carrying forming dies 2 with confectionery products along a rectilinear horizontal path there is provided a first transfer conveyor generally indicated at 3, which cooperates with a second transfer conveyor generally indicated at 4 and provided for depositing the removed products on a receiving conveyor 5 provided for feeding, for example, a wrapping machine (not shown). The first transfer conveyor consists of a chain conveyor 6 driven, for example, through gears 7 and 8 by a chain or belt drive 9. The chain conveyor 6 supports prehensile element 10 moving in synchronism with and in the same direction as the dies 2 along a lower first rectilinear path portion of the conveyor 3 and in opposite direction along an upper second rectilinear path portion of the conveyor 3. These prehensile elements 10 are each provided with suckers 11 and with a rod 13, which is axially movable under the action of a respective spring within a support secured to the chain 6. The suckers 11 are arranged on the side of the prehensile elements which lies outwardly of the closed path along which the prehensile elements travel. The said elements 10 are lowered to a collecting respectively depositing position by means of fixed cams 12 or similar devices. Thus, when the suckers 11 are over a die 2 to be emptied, they are lowered by the rod 13 perpendicularly to the chain direction for removing, by means of vacuum provided in the suckers 11, the products A from the dies 2 and for delivering the removed products, after having been rotated through 180°, to corresponding prehensile elements of the overlying second transfer conveyor 4. The latter is driven through gears 14, and 15 by a chain operated by gear 8 and comprises a chain 16 which carries in turn the prehensile elements 17, which are similar to the elements 10 of the first continuous or intermittent transfer conveyor 3. The prehensile elements 12 move along a first rectilinear path portion of the conveyor 4 in the same direction as the underlying prehensile elements 10 moving along the upper rectilinear path portion of conveyor 3. Near the gear 14, below a second rectilinear path portion of the conveyor 4, there is arranged the receiving conveyor 5 for supplying, for example, one or more wrapping machines.

Figure 2:
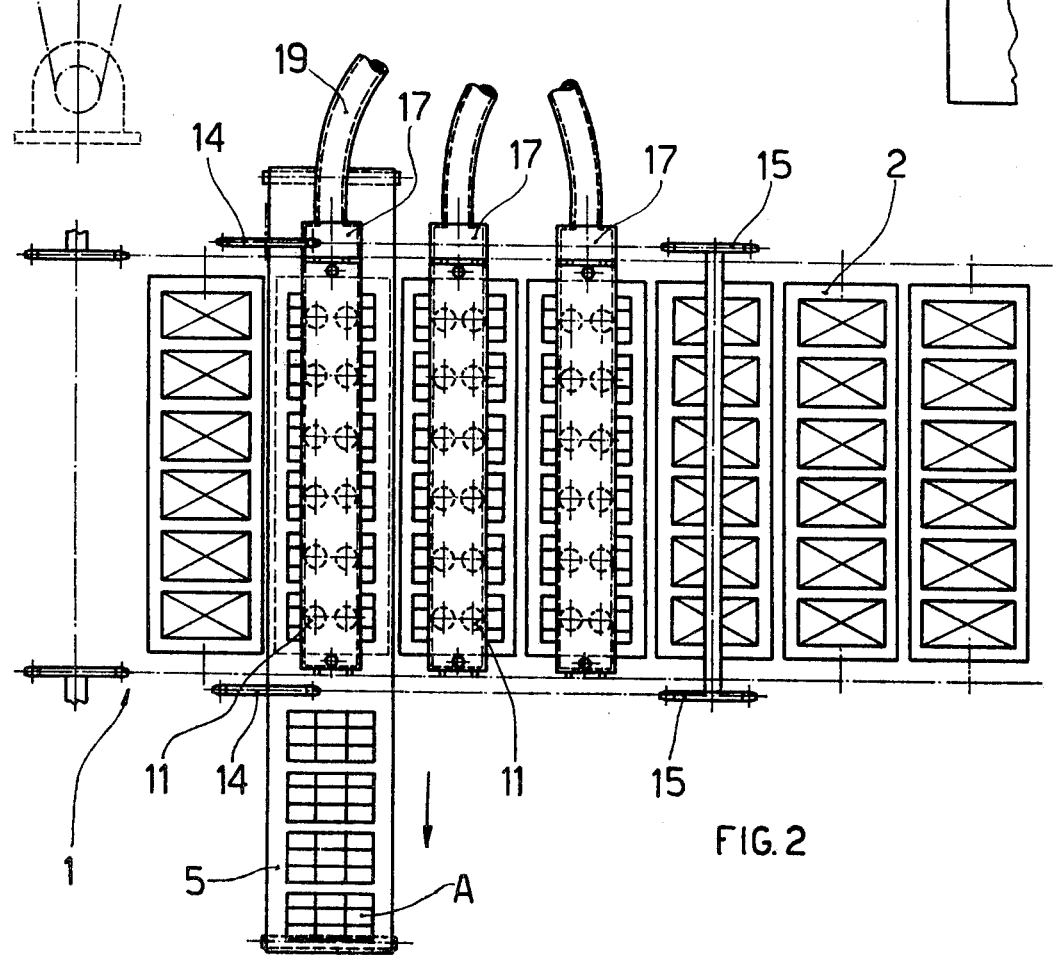
FIG. 2 is a plan view of the apparatus according to FIG. 1 in which the conveyor provided for removing the items has been omitted for reasons of better clarity.

In FIG. 2, for assuring a better view, the continuous or intermittent transfer conveyor 3 has been omitted, showing only part of the continuous or intermittent transfer conveyor 4. It is thus seen that the gears 14, and 15 are arranged on both longitudinal sides of the conveyor 1 carrying the pouring dies 2. The removing prehensile elements 17 extend across the whole width of the conveyor 1, which extends transversely to the receiving conveyor 5 on which the corresponding prehensile elements 17 deposit the removed products shortly before reaching the gear 14. As visible from the drawings, the planes of the conveyors 1 and 5 are parallel to each other and the conveyor 5 is arranged above the conveyor 1.

Figure 4:
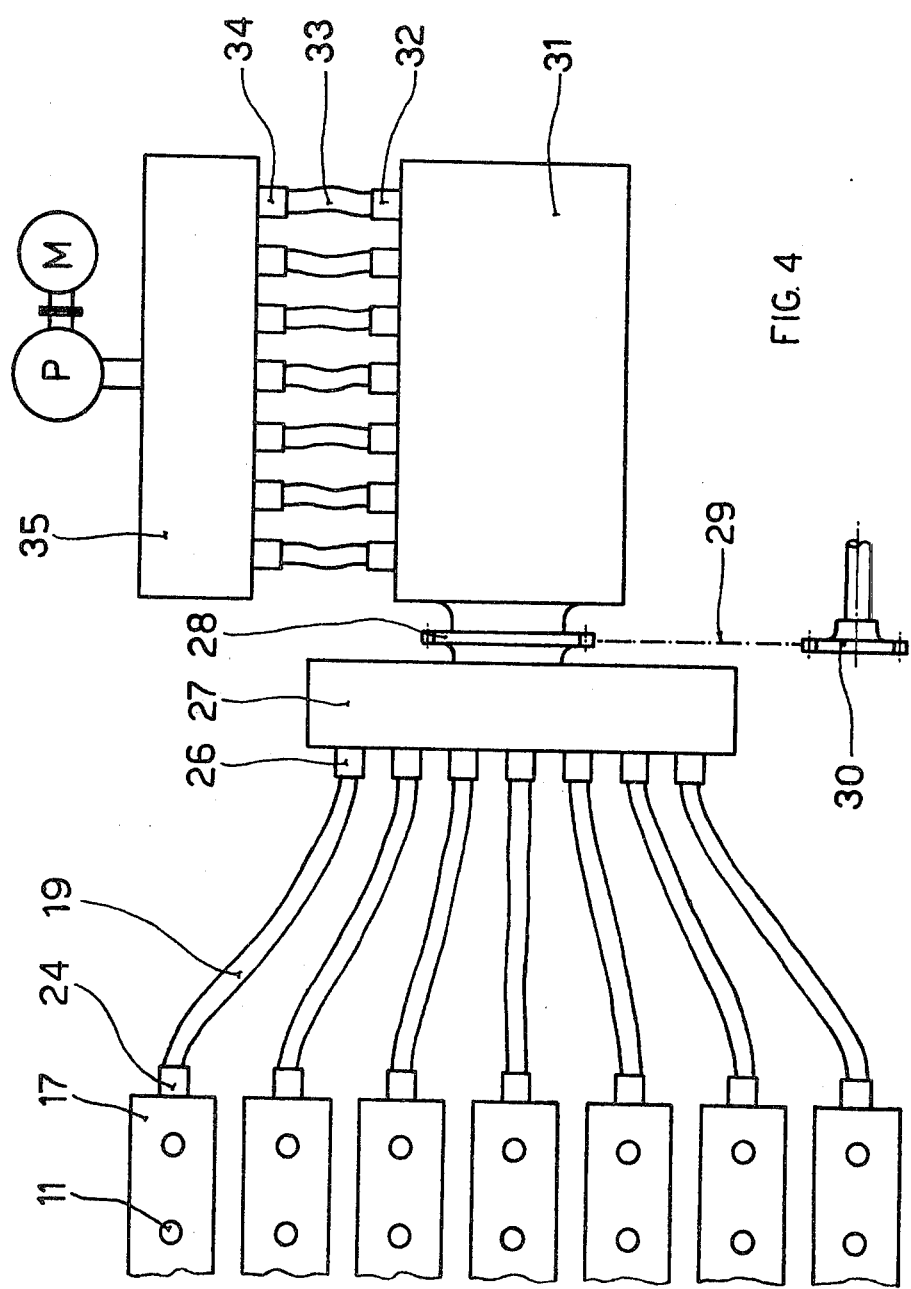
FIG. 4 shows schematically the means for vacuum generation and control in the single suckers of the prehensile elements.

Preferentially, each of the prehensile elements 10 and 17 consists of an elongate hollow body provided with a series of suckers 11 connected with an inner chamber of the elements 10, and 17. The inner chamber is connected to flexible hoses 19 leading to a vacuum source P (FIG. 4).

Figure 3:
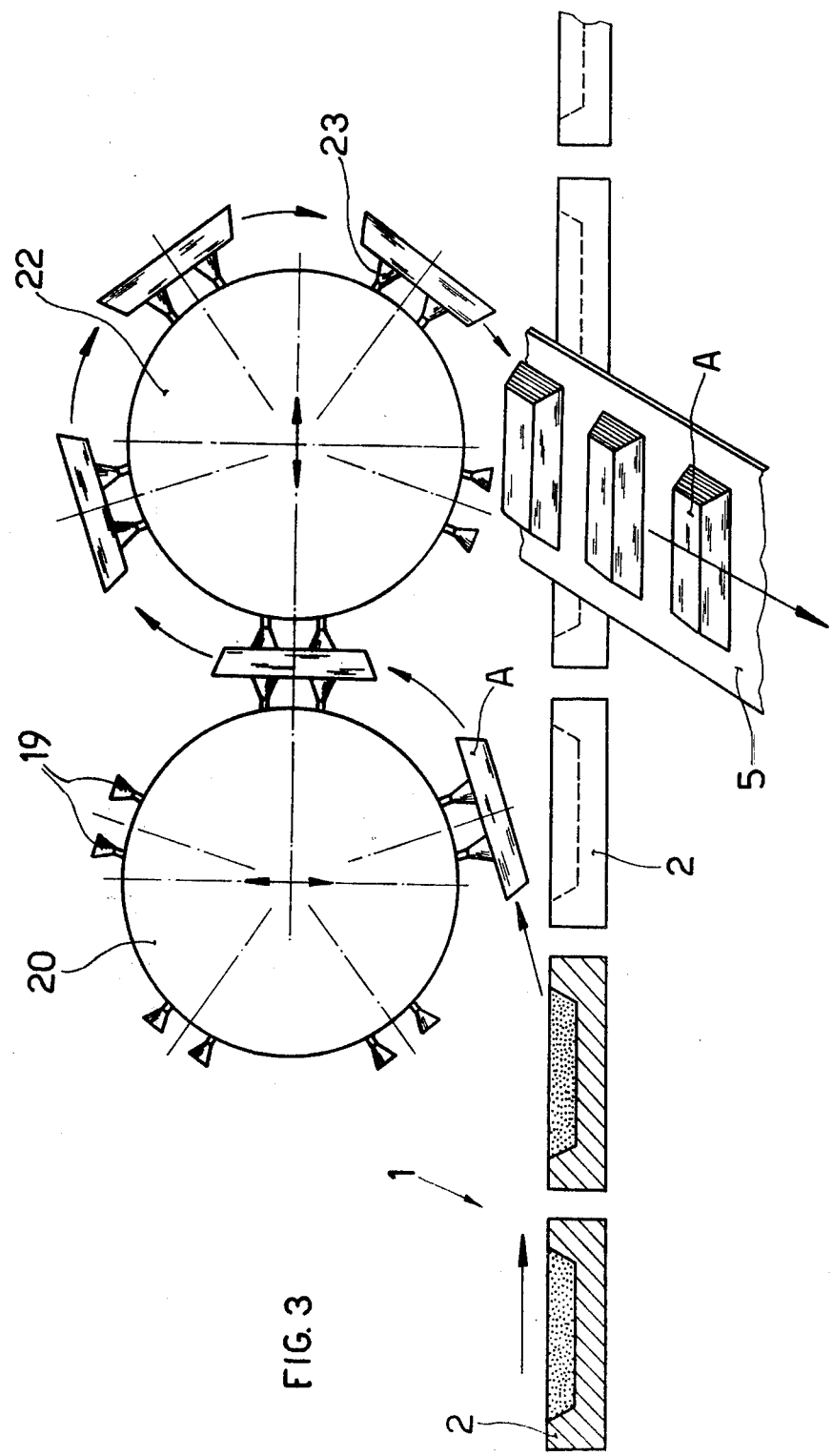
FIG. 3 shows a further embodiment of the invention comprising a first rotating drum conveyor complete with means for removing the products from the dies and a second rotating drum conveyor for depositing the products as required.

While FIGS. 1 and 2 show an apparatus using continuous chain conveyors, FIG. 3 shows an apparatus using rotating drums also provided with suckers.

As clearly shown in FIG. 3, the dies 2 of the conveyor belt 1 travel below a first rotating drum 20 equipped with suckers 21 which are projecting radially for removing the products from the corresponding dies 2 passing underneath the drum 20. For this reason the suckers 21 are movable in radial direction. The first drum 20 cooperates with a second drum 22, also provided with radially projecting suckers 23 movable in radial direction. The said second drum 22 is provided for receiving the confectionery products A supplied by the first drum 20 and for depositing them successively on the receiving conveyor 5 provided for feeding a wrapping machine.

This second embodiment of the invention is based upon the same idea as the first embodiment of FIGS. 1 and 2 and proposes a first rotating removing means cooperating with a second removing and depositing, continuously rotating means.

The problem of the vacuum control of the sincle suckers 11, 21 has been solved in a most simple and safe manner. In fact, it is indispensable that the suckers passing above the forming dies have a strong vacuum lasting at least until the delivery to the corresponding suckers on the second conveyor has been completed. In this moment the vacuum in the suckers of the first conveyor must be released, while that in the suckers of the second conveyor must last until the product A is arranged above the conveyor 5 leading to the wrapping machine. As stated above, the single removing respectively delivering prehensile elements 10 and 17 consist of a hollow body provided with suckers 11. Each hollow body 10, 17 has a union 24 connected by an elastic duct 19 to a corresponding union 26 of a rotating collector 27. The said collector 27 is, for example, driven through a gear 28 by a chain 29 and a second gear 30. The rotation of the collector 27 is perfectly synchronized with the annular movement of the hollow bodies 17 carrying the suckers 11, so that the elastic ducts 19 do not undergo to stresses and twisting. The collector 27 is arranged within a distributor 31 which will be described in detail hereinafter.

The said distributor 31 is fitted with unions 32 connected through ducts 33 and unions 34 of a known programmable valve unit 35. The said programmable valve unit 35 allows to connect as required by the ducts 33 with the vacuum source P driven by a motor M.

Figure 5:
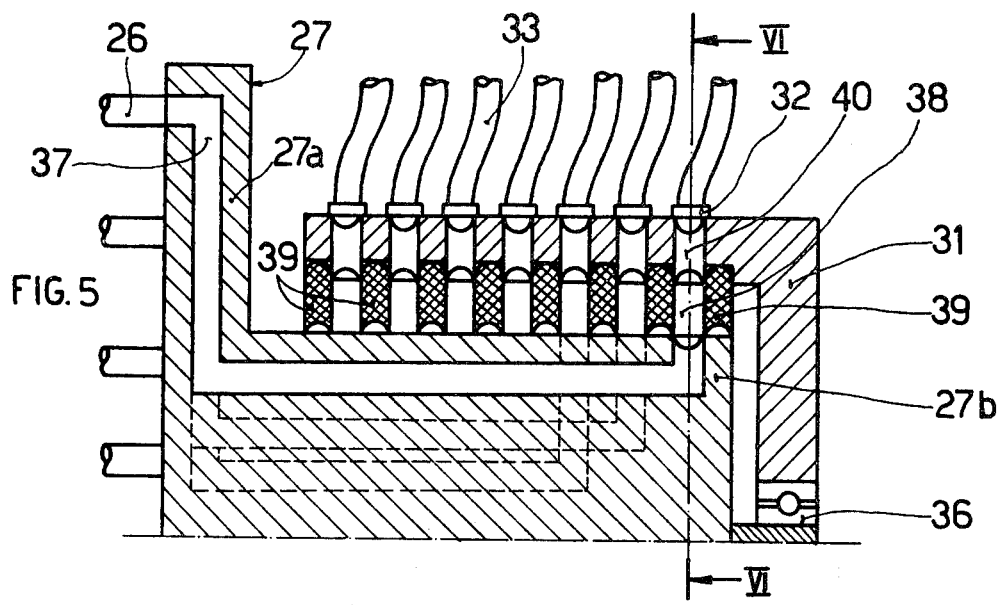
FIG. 5 shows schematically a detail of a device for the vacuum distribution and control of the various prehensile elements.
Figure 6:
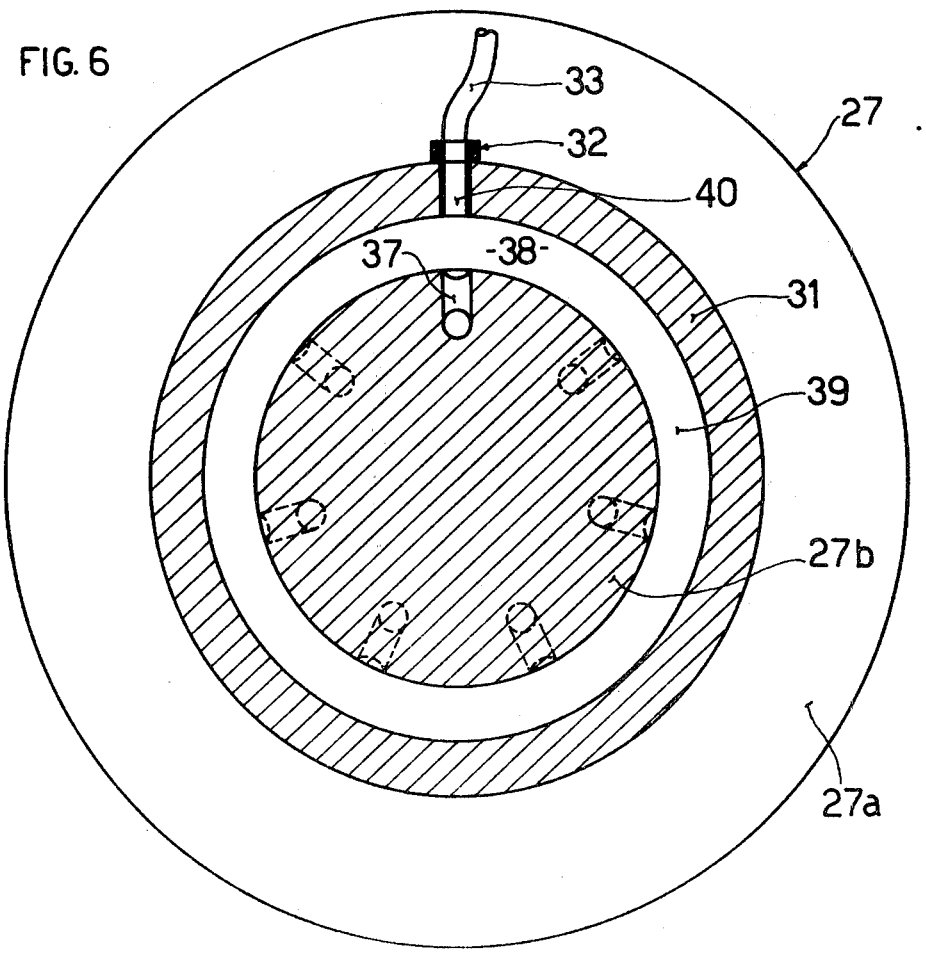
FIG. 6 is a section through the control device along the line VI—VI of FIG. 5.

As shown in FIG. 5, the collector 27 consists of a body rotating within a housing 31. At the front the said collector 27 has a flange body 27a connected to a cylindrical body 27b which is projecting into the housing 31 where it is rotatably supported, for example, at 36. The flange body 27a is provided at the unions 26 with corresponding channels 37 which lead along the cylindrical part 27b into annular chambers 38 defined between the housing 31, the cylindrical body 27b and annular seals 39 spaced as required in axial direction around the cylindrical body.

Each annular chamber 38 communicates with a corresponding channel 37 and a corresponding hole 40 provided in the housing 31 and connected by means of the respective union 32 with the corresponding duct 33 which is leading to the programmable valve unit 35.

Thus, each duct 19 is connected through a respective channel 37 with an annular chamber 38 and, therefore, with the programmable valve unit 35 assuring thus in a simple and safe manner the connection of the ducts 19, leading to the suckers 11 of the elements 10 and 17, to the vacuum source P.

This results in a simple and safe control unit for the removing and delivering suckers 11.

What we claim is:

1. An apparatus for transferring products particularly in a wrapping machine, comprising a feeding conveyor carrying said products along a rectilinear horizontal path, a receiving conveyor arranged downstream of said feeding conveyor, a first transfer conveyor arranged above said feeding conveyor and having a first and a second rectilinear path portion parallel to said rectilinear path of said feeding conveyor, said second rectilinear path portion being arranged above said first rectilinear path portion and said first transfer conveyor being movable in the same direction as said feeding conveyor along said first rectilinear path portion and in a direction opposite thereto along said second rectilinear path portion, a second transfer conveyor arranged above said first transverse conveyor and having a first rectilinear path portion above said second rectilinear path portion of said first transfer conveyor and a second rectilinear path portion above said receiving conveyor, said second transfer conveyor being movable along said first rectilinear path portion thereof in the same direction as said first transfer conveyor along said first rectilinear path portion thereof, prehensile elements carried by said first and second transfer conveyors for mutual cooperation, each of said prehensile elements being movable along a closed path and comprising suckers on the side lying outwardly of said closed path, said prehensile elements carried by said first transfer conveyor being rotated through 180° when passing from said first to said second rectilinear path portion of said first transfer conveyor, means for lowering said prehensile elements when they move along said first rectilinear path portions of said transfer conveyors to cause the corresponding suckers carried by said first transfer conveyor to come into contact with corresponding of said products carried by said feeding conveyor and the corresponding suckers carried by said second transfer conveyor to come into contact with respective of said products supported by corresponding upwardly directed suckers of said prehensile elements movable along said second rectilinear path portion of said first transfer conveyor, and means for providing a vacuum in said suckers when said prehensile elements travel from said first to said second rectilinear path portions of said transfer conveyors to cause the corresponding suckers to take up and transfer the products contacted thereby.

2. An apparatus as claimed in claim 1, wherein said receiving conveyor moves in a plane parallel to said feeding conveyor above thereof and extends transversely to said conveyor.

3. An apparatus as claimed in claim 1, wherein said prehensile elements comprise elongate hollow bodies extending transverse to said first and second transfer conveyors and parallel to said receiving conveyor.

* * * * *